United States Patent
Pandolfi (10) Patent No.: US 6,434,000 B1
(45) Date of Patent: Aug. 13, 2002

(54) ENVIRONMENTAL SYSTEM FOR RUGGED DISK DRIVE

(75) Inventor: Richard Pandolfi, Smithtown, NY (US)

(73) Assignee: IV Phoenix Group, Inc., Hauppauge, NY (US)

( * ) Notice: Subject to any disclaimer, the term of this patent is extended or adjusted under 35 U.S.C. 154(b) by 0 days.

(21) Appl. No.: 09/610,585

(22) Filed: Jul. 5, 2000

Related U.S. Application Data (63) Continuation-in-part of application No. 09/204,233, filed on Dec. 3, 1998.

(51) Int. Cl.[7] .............................................. H05K 7/20
(52) U.S. Cl. ........................ 361/685; 361/707; 136/204; 62/3.3
(58) Field of Search ................................. 361/685, 683, 361/684, 686, 724–727, 732, 740, 688, 690, 699, 704, 707, 715, 687; 62/3.2, 3.7, 3.3; 136/204, 205

(56) References Cited

U.S. PATENT DOCUMENTS

| | | | |
|---|---|---|---|
| 4,513,352 A | * 4/1985 | Bennett et al. | 361/715 |
| 4,734,820 A | * 3/1988 | Lauffer et al. | 361/715 |
| 4,812,733 A | * 3/1989 | Tobey | 323/285 |
| 4,980,754 A | * 12/1990 | Kotani et al. | 257/786 |
| 5,224,016 A | 6/1993 | Weisman et al. | 361/728 |
| 5,409,547 A | * 4/1995 | Watanabe et al. | 136/204 |
| 5,419,780 A | * 5/1995 | Suski | 136/205 |
| 5,655,375 A | * 8/1997 | Ju | 62/3.6 |
| 5,921,087 A | * 7/1999 | Bhatia et al. | 62/3.2 |
| 5,927,386 A | * 7/1999 | Lin | 361/685 |

* cited by examiner

*Primary Examiner*—Darren Schuberg
*Assistant Examiner*—Hung Van Duong
(74) *Attorney, Agent, or Firm*—Venable; John P. Shannon; Chad C. Anderson

(57) ABSTRACT

An arrangement for supplementing passive heat transfer from a hard disk drive housing to a surrounding environmental housing includes active heat transfer devices and an arrangement biasing the disk drive housing into heat conducting contact with the environmental housing. The environmental housing includes a heat conducting outer shell and an internal heat conducting plate spaced from the shell, with the active heat transfer devices positioned in the space. In one embodiment, lifting devices having relatively moveable wedge members are actuatable to lift the disk drive housing into firm contact with the heat conducting plate. In another embodiment, the hard disk drive is moved into heat conducting contact by the cooperation of pins on the disk drive housing and inclined surfaces in the environmental housing, along with wedge members on a door of the environmental housing. The active heat transfer devices can be Peltier effect devices or heat pipes.

25 Claims, 5 Drawing Sheets

ENVIRONMENTAL SYSTEM FOR RUGGED DISK DRIVE

CROSS REFERENCE TO RELATED APPLICATION

This is a continuation-in-part of Ser. No. 09/204,233 filed on Dec. 3, 1998.

BACKGROUND OF THE INVENTION

1. Field of the Invention

This invention relates to an improved environment system for sealed hard disk assemblies, and more particularly to a system that extends the operating life of the hard disk assemblies when subject to high operating temperatures.

2. Description of the Prior Art

Figure 1:
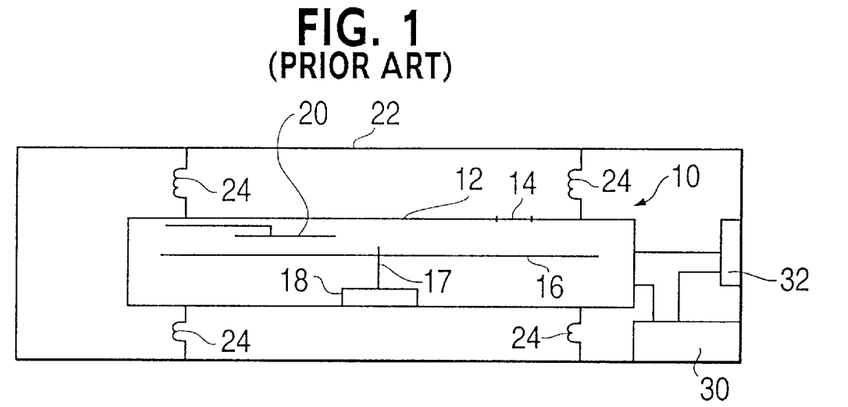
FIG. 1 is a schematic illustration of a prior art environmentally protected hard disk drive cartridge.

FIG. 1 schematically illustrates a commercially available sealed, hard disk drive and its environment control enclosure that makes the disk drive suitable for use in rugged applications where it is subject to high temperature and mechanical shock and/or vibration. One such sealed hard disk and environment control enclosure is available from Miltope Corporation and referred to by Miltope as the LPC Series of rugged high capacity, low profile, shock and vibration resistant disk drives employing sealed, disk drive housings. These products are ruggedized for operation in severe field environment where extremes of temperature, shock, vibration, humidity and air pressure are common. They are designed for "on-the-move" operation in tracked and wheeled vehicles, as well as airborne and shipboard applications. As illustrated in FIG. 1, this prior art disk drive includes a commercially available sealed hard disk drive 10, such as the sealed hard disk drive available from Toshiba, IBM Corp., Seagate and others. Such hard disk drives include a disk housing 12, which is sealed except for a very small opening 14 that allows a small amount of gas sealed in the housing 12 to egress and ingress during disk start up and shut down respectively. A hard disk 16 within the housing 12 rides on a spindle 17 driven by a motor 18, both of which are also located within the housing 12. A flying head 20 is servo positioned over a desired track on the disk 16 in order to read from and write data onto the disk. The housing 12 is supported in a sealed, ruggedized hard disk drive housing 22 by resilient mounts 24, i.e. devices to mechanically isolate rapid acceleration due to shock or vibration, for example, of the hard disk drive housing 22 from the disk housing 12. The hard disk drive housing 22 is an air tight aluminum housing filled with an inert gas or, if desired, with dry or low humidity air. This sealed aluminum housing 22 can also house a control electronics module 30. An embedded closed loop servo system compensates for temperature variation, ensuring reliable head positioning. An air tight connector 32 provides a signal and power interface between the components inside the hard disk drive housing 22 and connections (not shown) outside of the housing. As will be appreciated by those skilled in the art, hard disk drives of the type shown schematically in FIG. 1, store multi-gigabytes of data on a 2.5 inch or 3.5 inch disk, with the hard disk drive housing 22 having a foot print of approximately 5 inches by 8 inches by 1.5 inches deep for a 3.5 inch disk, or appropriately smaller for a 2.5 inch or smaller hard drive. The expected mean time between failures is normally in excess of 100,000 hours in a normal environment application.

While quite satisfactory in normal office type operation, the hard disk drive systems of the type shown in FIG. 1 have experienced a significant increase in failures when operating at very high temperatures.

SUMMARY OF THE INVENTION

An object of this invention is the provision of a hard disk drive system with a small footprint and rugged shock resistance (i.e. of the type described in connection with FIG. 1) but which can operate in a high temperature and/or high humidity environment without a significant decrease in mean time between failure.

Applicant has identified the cause of an increase in failure rate of hard disk systems operating in high temperature environments as the lubricant used to lubricate the disk drive motor 18. Oil from the spindle motor has been found to wick and/or vaporize out of the motor bearing when operated at high temperatures. The lubricant has been found to form a deposit on the flying head and disk surface, eventually causing it to contact the disk and cause permanent damage as well as cause spindle motor bearing failure which causes permanent damage. In addition, when the hard drive is turned on, internal air is expelled as the air is heated through the breathing hole/filter generally used in disk drives of the magnetic media type due to the high speed rotation of the disk platter. When a drive is powered off, and cools down, make-up air is drawn in. If humidity is present, the make-up air can contain humidity or other contaminants which can deposit residue on the read/write head and disk platters, which can cause unstable flying of the read/write head and cause damage to the unit which can result in permanent failure. In addition, the disk drive electronics have caused circuit drifts and failures at temperatures above 135° F.

Applicant's solution to the problem that applicant has identified is to provide an active heat transfer device inside an environmental housing in which the hard disk drive housing is placed, in order to transfer heat away from the hard disk drive without necessarily increasing the overall footprint of the system or coupling shock or vibration from the environmental housing to the disk drive. In some embodiments of the invention, the active heat transfer device is a thermoelectric solid state heat pump that uses the Peltier effect to move heat. As will be appreciated by those skilled in the art, such solid state heat pumps are commercially available, for example from Melcor corporation. These heat pumps consist of a number of p type and n type pairs connected electrically in series and sandwiched between two ceramic plates. When the heat pumps are connected to a d.c. source, current causes heat in each heat pump to move from one plate to the other, making one ceramic plate a relatively hot plate and the other ceramic plate a relatively cool plate, and creating a relatively hot side and a relatively cool side on the heat pump. In one embodiment of the invention, the environmental housing comprises an outer shell of a heat conductive material, such as aluminum, and a receptacle for receiving a hermetically sealed hard disk drive housing or cartridge. The receptacle comprises two side walls and a bottom wall, all made of heat insulating material, such as polyurethane, and a top wall comprising a heat conducting structure of a heat conducting material, such as aluminum. The heat pump is interposed between the heat conducting structure and the outer shell of the environmental housing, with the cool side of the heat pump contacting the heat conducting structure of the receptacle, and the hot side of the heat pump contacting the outer shell of the environmental housing. Fins of heat conducting material, such as aluminum, are positioned on the outside of the environmental housing. The heat insulation minimizes the transfer of heat from a hot environment to the disk drive, and heat in the disk drive is transferred to the environment by the active heat transfer device and the environmental housing, including the fins.

An arrangement is provided for biasing the hard disk drive housing into heat conducting contact with the heat conducting structure of the environmental housing.

In one embodiment, the biasing arrangement comprises wedge members interposed between the disk drive housing and the environmental housing, the wedge members cooperating with one another to bias the disk drive housing into heat conducting contact with the heat conducting structure of the environmental housing. The wedge members are associated with actuating mechanisms having portions which block the environmental housing door from closing when the disk drive housing is not in flat, heat conducting contact with the heat conducting structure and which permit the door to close when the disk drive housing is in flat, heat conducting contact with the heat conducting structure. Portions of the actuating mechanisms use the environmental housing as a fulcrum to eject a portion of the disk drive housing from the environmental housing.

In another embodiment, a wedge structure comprising a groove is defined in each side wall of the receptacle, each groove having a lower surface inclined upwardly from an end opening of the receptacle to the interior of the receptacle. A pin is provided on each opposed side of the hard disk drive housing, each pin being supported by the lower surface of a respective one of the grooves. As a result, as the hard disk drive housing is inserted into the receptacle, the leading end of the top surface of the housing is cammed into with the heat conducting structure at the top of the receptacle. The environmental housing has a door from which a wedge structure projects toward the disk drive housing. As the door is closed, the wedge structure biases the disk drive housing forward and upward into firm flat heat conducting contact with the heat conducting structure of the environmental housing. Thus, heat is transferred from the hard disk drive housing to the heat conducting structure of the receptacle, from the heat conducting structure to the heat pump, and from the heat pump to the shell and cooling fins of the environmental housing.

A plurality, e.g., two or three, of the solid state heat pumps are connected in parallel in thermal management circuitry which is a closed loop system used to provide the desired cooling for the disk drive. Each heat pump is operated significantly below its heat transfer capacity in order to significantly increase the efficiency with which the cooling is accomplished. The use of a plurality of heat pumps also provides redundancy in case one or more of the heat pumps should fail. If one of the pumps fails, the thermal management circuitry seeks to maintain a certain temperature differential or to not allow the drive temperature to exceed 55° C. (internal) and therefore increased power proportionately. At below freezing, the direction of current through the solid state heat pump is reversed. As a result, heat is driven into the disk drive housing, thereby heating the housing. The exact temperature varies, depending on the type of disk drive and the spindle motor bearing friction. The friction varies according to the type of lubricating grease or oil used or, in the case of a non-lubricant bearing, the temperature at which the direction of current is reversed could be based on the friction at low temperatures. A temperature sensor, for example, a thermistor, is bonded directly to the metal hard disk drive for monitoring the temperature inside the disk drive housing.

In another embodiment, the heat pump is omitted in favor of a heat pipe. Heat pipes have been used to cool aircraft power supplies and densely packed electronics in portable computers. One particular type of heat pipe, manufactured by Thermacore, Inc. of Lancaster, Pa., consists primarily of a porous material soaked in a low vapor-point liquid, such as acetone or methanol. When the liquid is heated, it vaporizes and is forced to the center of the pipe. It then travels to one end, where it condenses and releases its heat. At that point, the cooled liquid is wicked back to where it started, and the process repeats. The heat pipe can be generally U-shaped, with one side being secured to the heat conducting structure of the receptacle, and the other side being secured to the outer shell of the environmental housing. Flexibility is provided in the heat pipe by, for example, a flexible bellows between the two sides of the heat pipe. Heat from the side in contact with the heat conducting structure flows through the heat pipe to the side in contact with the environmental housing.

BRIEF DESCRIPTION OF THE DRAWINGS

The foregoing and other objects, aspects and advantages will be better understood from the following detailed description of a preferred embodiment of the invention, in which like reference numbers have been used to identify like part in different figures, and in which.

DETAILED DESCRIPTION OF THE PREFERRED EMBODIMENTS

Figure 2:
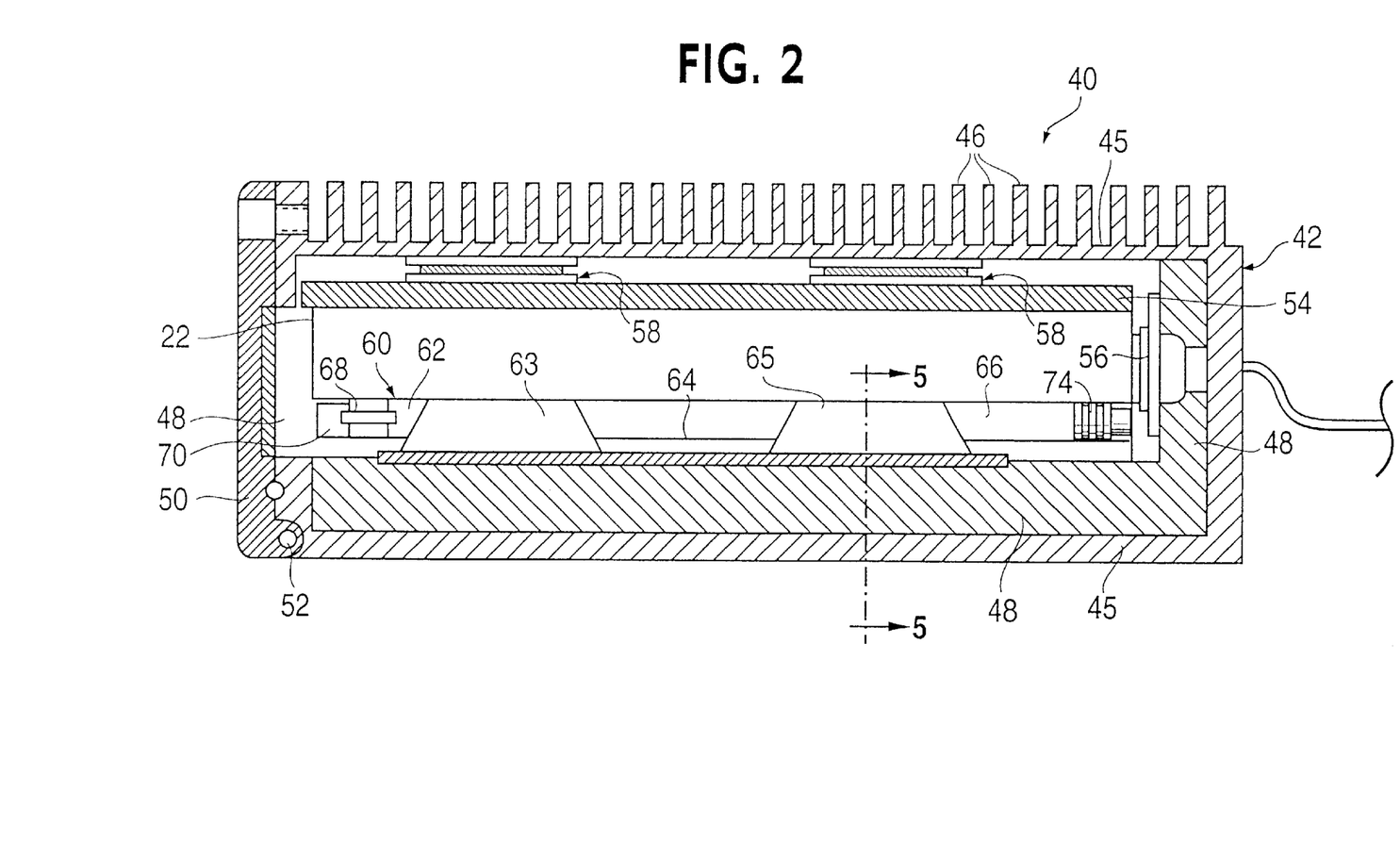
FIG. 2 is a cross section of a first arrangement of a hard disk drive cartridge in an environmental housing according to the present invention.

As can be seen from FIG. 2, an arrangement 40 according to the present invention for supplementing passive heat transfer from a hard disk drive housing 22 similar to that shown in FIG. 1 supported in an environmental housing 42. The environmental housing 42 includes an external shell 45 of a heat conducting material, such as aluminum, having fins or ribs 46 in order to increase the outer surface area of the housing and to thereby increase the rate of heat transfer from the outer surface of the housing.

A lining 48 of heat insulating material covers bottom, side and end walls of the environmental housing 42. One end wall of the environmental housing 42 is defined by a door 50 that covers an open end of the housing, which is sized to permit the disk drive housing 22 to pass in and out. The door 50 is connected to the rest of the environmental housing 42 by a pivot connection 52. At the top of the environmental housing 42, a heat conducting structure 54 of a heat conducting material is spaced below a top wall of the shell 45, and the fins 46 extend from the top wall and other portions of the environmental housing. In the illustrated embodiment, the heat conducting structure 54 is a horizontal flat plate of aluminum having a smooth surface facing the disk drive housing 12. The heat conducting structure 54 extends over the entire top surface of the disk drive housing 22. A thermally sealed connector 56 has a first portion mounted in the environmental housing and a second portion mounted on an adjacent area of the disk drive housing 22, so that a connection is made when the disk drive housing is inserted into the environmental housing. The connection tends to retain the disk drive housing 22 in the environmental housing 42.

A plurality of active heat transfer devices is positioned in the environmental housing 42, between the heat conducting structure 54 and the top of the shell 45. In this embodiment of the invention, the active heat transfer devices are solid state heat pump 58 hat employ the Peltier effect. One side of each solid state heat pump 58 contacts the upper surface of the heat conducting structure 54. Direct current power, which is coupled to the heat pumps 58 via the connector 56, is of such a polarity that the side of the heat pump contacting the heat conducting structure is the cold side, and the hot surface of the heat pump is on the side away from the disk drive housing 12.

Figure 3:
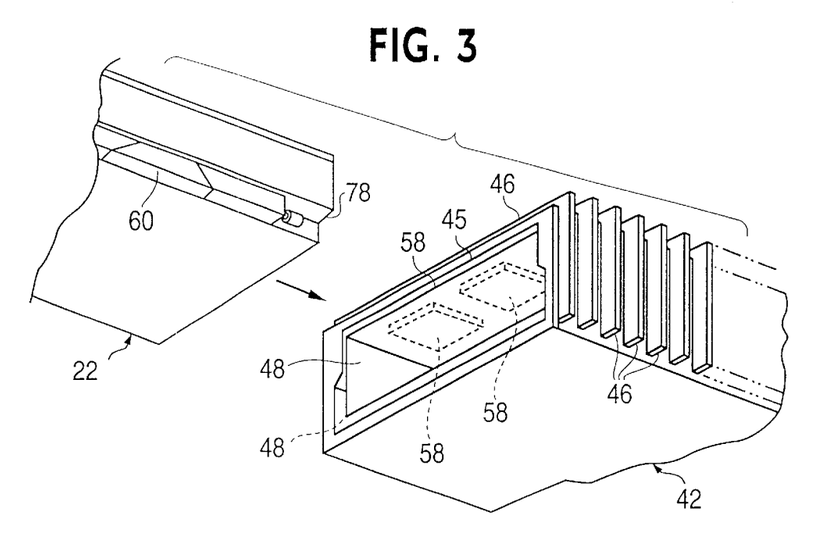
FIG. 3 is a partial exploded isometric view taken from the front, bottom and left side of FIG. 2, showing the hard disk drive cartridge prior to insertion into the environmental housing.

The heat pumps 58 together have a heat transfer capacity much greater than the supplemental heat transfer needs of the ruggedized hard disk system. For example, each heat pump 58 is capable of operating at 6 amps at 12.5 watts maximum, with a temperature difference between its hot and cold sides having a maximum of 67° C. However, in accordance with the present invention, in order to achieve greater efficiency, each heat pump 58 is operated at, for example, 2.0 to 2.5 watts each to provide a temperature difference of 30° F. between the inside of the disk drive housing 22 to the inside of the environmental housing 42. Although the illustrated embodiment employs four heat pumps 58, as indicated by FIGS. 2 and 3, other numbers of heat pumps can be used.

The present invention includes an arrangement for biasing the disk drive housing 22 into firm heat conducting contact with the heat conducting structure 54 over the entire surface of the top of the disk drive housing. In the embodiment of FIGS. 2–6, the biasing arrangement includes two lifting devices 60 secured to bottom edges of the disk drive housing 22. Each lifting device includes a plurality of wedge members 62, 63, 64, 65 and 66 mounted on a rail 68 and having inclined surfaces which coact with one another to raise the disk drive housing 22. An actuator lever 70, which is pivotally connected at 69 to the rail 68, has a cam portion 72 engaging a sliding washer 73 to shorten the distance between the wedge members 62 and 66 and, thereby, force the wedge members 63 and 65 out of alignment with the wedge members 62, 64 and 66. Spring washers 74 limit the movement of the wedge member 66. The lifting devices are described in more detail in U.S. Pat. No. 5,224,016, which is incorporated herein by reference.

Figure 4:
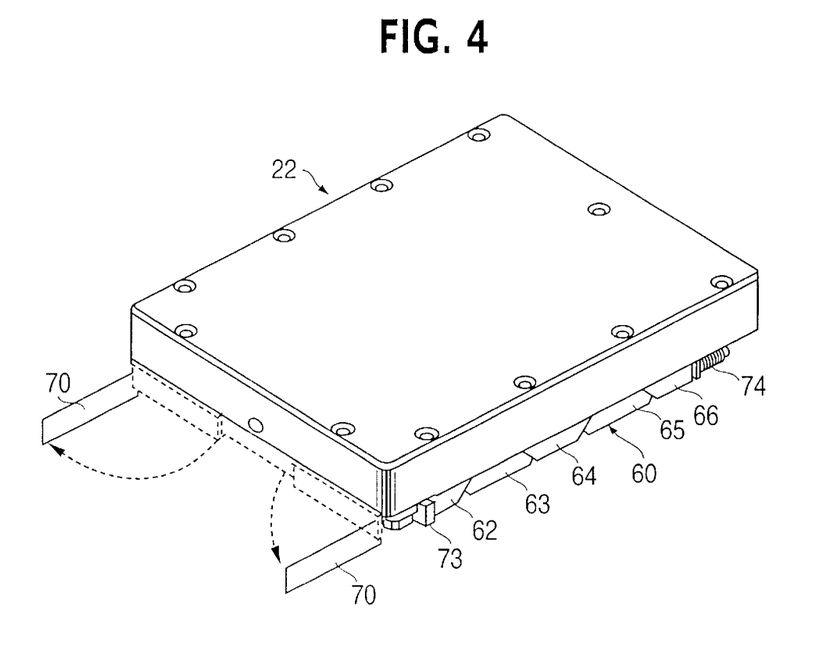
FIG. 4. is an isometric view of the hard disk drive cartridge, taken from the front, top and left side of FIG. 2.
Figure 5:
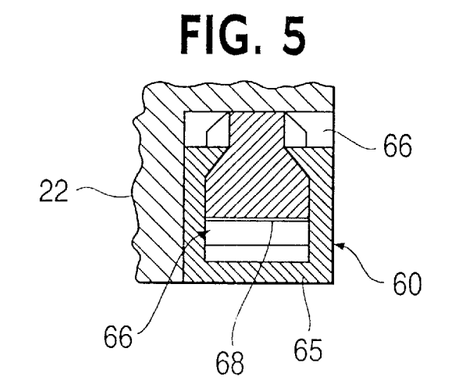
FIG. 5 is a cross section taken along the line 5—5 in FIG. 2 of a portion of the disk drive housing and a mechanism for wedging the disk drive housing into heat transferring contact with the environmental housing.
Figure 6:
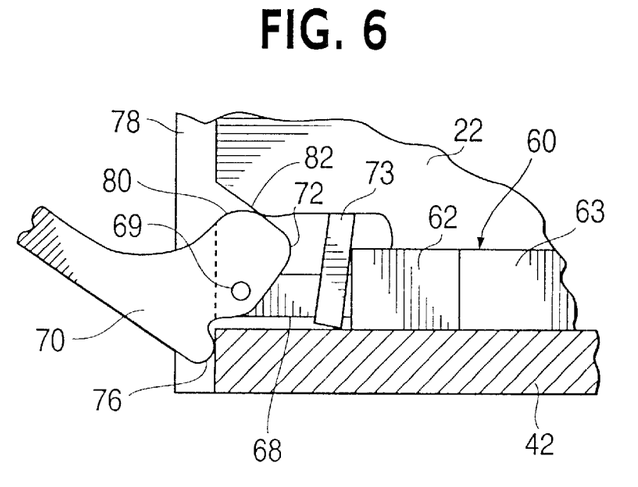
FIG. 6 is a partial bottom view of the disk drive housing of FIG. 5, a wedging mechanism and a wall of an environmental housing.

As can be appreciated from FIGS. 2 and 4, the actuator levers 70 are movable between a first position, shown in solid lines in FIG. 4, in which the wedge members 62–66 are all in alignment, and a second position shown in FIG. 2 and in dashed lines in FIG. 4, in which the wedge members 63 and 65 are forced out of alignment. In the second position, the disk drive housing 22 is biased into firm flat, heat conducting contact with the heat conducting structure 54.

In the first position, the actuator levers 70 project out of the open end of the environmental housing 42 and thereby prevent the door 50 from closing. In the second position, the actuator levers 70 are out of the way of door 50 and permit the door to close. As can be appreciated from FIG. 6, the actuator levers 70 have an ejector portion 76 which engages an end of a side wall of the environmental housing 42 and uses the wall as a fulcrum to eject a portion of disk drive housing 22 from the environmental housing. Furthermore, a portion 78 of the bottom of the disk drive housing 22 is recessed in the area of the actuator levers so that the actuating levers fit within the outline of the disk drive housing when the actuating levers are in their second position. The recessed portion 78 extends along the sides of the bottom surface of the disk drive housing 22 to receive the rest of each of the lifting devices 60. As a result, the rest of each of the lifting devices 60 is within the outline of the disk drive housing 22. Each actuating lever 70 has a detent portion 80 that resiliently engages a corner 82 respective on the disk drive housing 22 to retain the actuating lever in its second position.

Figure 7:
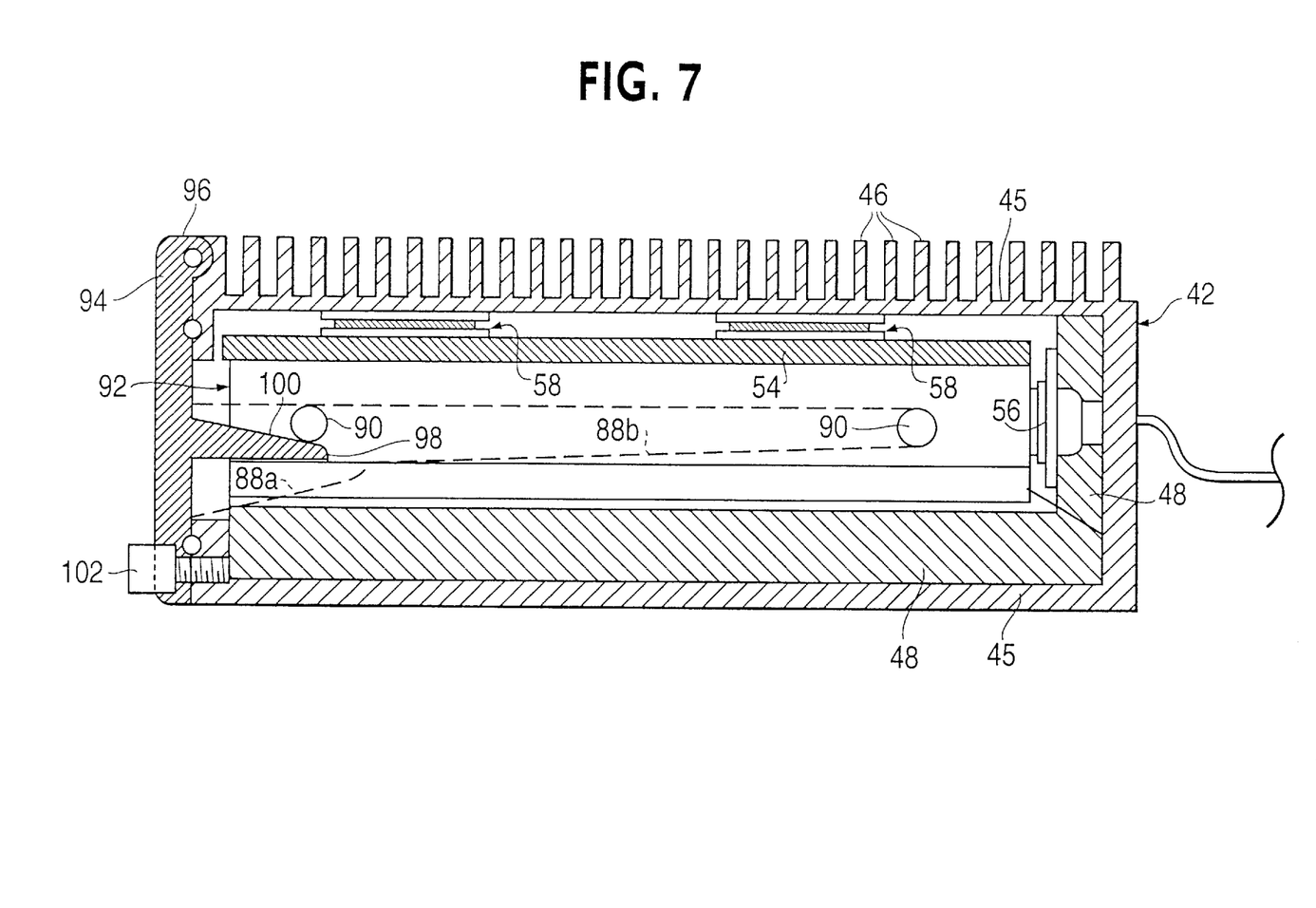
FIG. 7 is a cross section of a second arrangement of a hard disk drive cartridge in an environmental housing according to the present invention.
Figure 8:
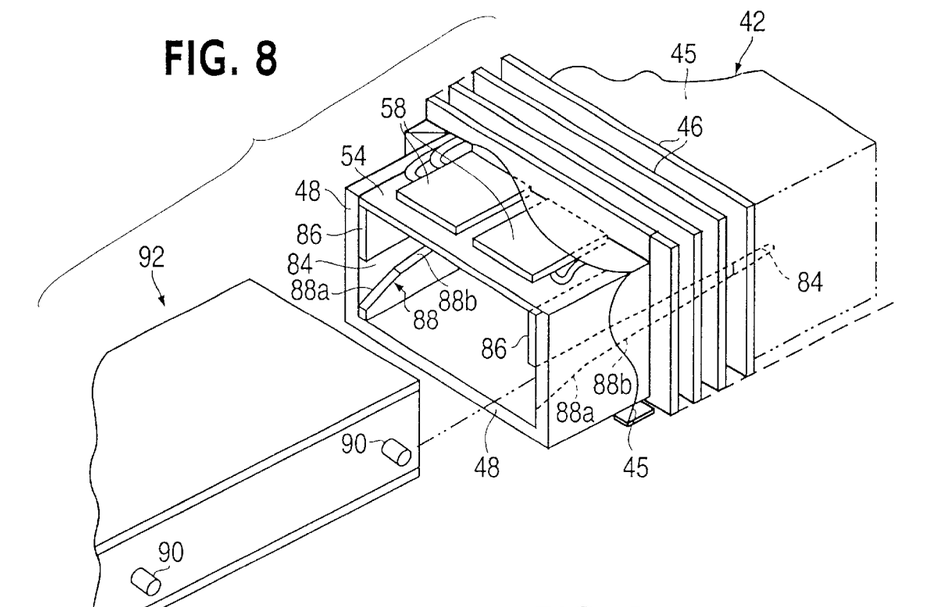
FIG. 8 is a partial exploded isometric view taken from the cartridge front, top and left side of FIG. 7, showing the hard disk drive prior to insertion into the environmental housing.

As can be seen from FIGS. 7 and 8, in another embodiment of the present invention, the biasing arrangement includes a wedge structure comprising a groove 84 defined in a plate 86 fixed along each side wall of the environmental housing 42, inward of the lining 48 of the heat insulating material. Each groove 84 has a lower surface 88 inclined upwardly from the open end of the environmental housing 42 to the closed end. A first portion 88a of the lower surface 88 near the open end of the environmental housing 42 has a steeper slope than a second portion 88b extending farther into the environmental housing. Pins 90 protrude from opposite sides of a disk drive housing 92 into the grooves 84. Two pins 90 are provided on each side of the disk drive housing, one pin 90 on each side being near the leading end of the disk drive housing as the disk drive housing is inserted into the environmental housing 42, and the other pin 90 on each side being near the trailing end of the disk drive housing. When the disk drive housing 92 is fully inserted into the environmental housing 42, the pins 90 near the trailing end of the disk drive housing overlie the steeper first portions 88a of the lower surfaces 88 of the grooves 84. In this embodiment, a door 94 is connected to the environmental housing 42 by a pivot connection 96 at the top. Wedge structures 98 each having an inclined upper surface 100 project inwardly from opposite ends of the door 94. The wedge structures 98, one of which is visible in FIG. 7, project inward sufficiently to support the pins 90 near the trailing end of the disk drive housing 92. The wedge structures 98 are in alignment with the pins 90 and are spaced sufficiently from one another to straddle the disk drive housing 92. As the door 94 pivots closed, the upper surfaces 100 of the wedge structures 98 engage areas at the bottom and front of the pins 90 near the trailing end of the disk drive housing 92, thereby urging the disk drive housing forward in the environmental housing 42 and lifting the trailing end of the disk drive housing. As a result, the top of the disk drive housing 92 is biased into firm flat, heat conducting contact with the heat conducting structure 54. Quick-connect fasteners 102, such as thumbscrews, hold the door 94 closed.

Figure 9:
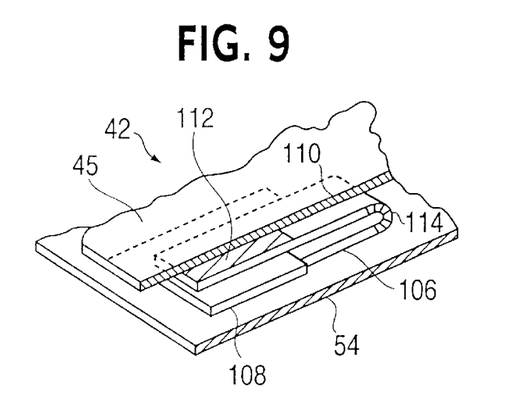
FIG. 9 is an enlarged isometric view of a heat pipe positioned in an environmental housing in accordance with the present invention.

As can be appreciated from FIG. 9, heat pipes 104 can be positioned in the space between the heat conducting structure 54 and the environmental housing 42. Each heat pipe 104 includes a first portion 106 having a large flat surface 108 in contact with the heat conducting structure 54 for heat transfer from the heat conducting structure 54 to the heat pipe. The heat pipe 104 also has an opposite portion 110 having a large flat surface 112 in contact with an interior surface of the environmental enclosure 42 for heat transfer from the heat pipe to the environmental enclosure. The portions 106 and 110 of the heat pipe 104 can be secured to the heat conducting structure 54 and the environmental enclosure 42, respectively, in a conventional manner, such as by a heat-conductive adhesive, for example, the epoxy commercially available as Loctite Output 380. The heat pipe 104 is flexible between the first and second portions 106 and 110, such as by the use of a flexible bellows portion 114 between the first and second portions. In the illustrated embodiment, the heat pipe 104 has a generally U-shape and includes an outer shell which can be made of, for example, stainless steel or copper. Heat transferred into the first portion 106 of the heat pipe 104 from the heat conducting structure 54 vaporizes a low vapor-point liquid in that portion of the heat pipe and causes it to flow to the opposite portion 110 of the heat pipe, where the liquid transfers its heat through the outer shell of the heat pipe at the second portion 110 to the environmental enclosure 42 and condenses. The condensed, cooled liquid is wicked back to the first portion 106, and the process repeats.

While the invention has been described in terms of several preferred embodiments, those skilled in the art will recognize that the invention can be practiced with modification within the spirit and scope of the appended claims.

Having thus described our my invention, what I claim as new and desire to secure by Letters Patent is as follows:

1. In a ruggedized hard disk system in which a hard disk, its motor drive, and its flying head are enclosed and shock mounted in a disk drive housing, and the disk drive housing is mounted in an environmental housing having an interior and an exterior, the improvement comprising:
    an arrangement supplementing passive heat transfer from the disk drive housing to the environmental housing, the arrangement including an active heat transfer device positioned between the disk drive housing and the exterior of the environmental housing.

2. In a ruggedized hard disk system as in claim 1, further comprising a heat conducting structure of heat conducting material positioned between the disk drive housing and the active heat transfer device.

3. In a ruggedized hard disk system as in claim 1, wherein said active heat transfer device is a solid state heat pump.

4. In a ruggedized hard disk system as in claim 1, wherein said environmental housing includes an external shell made of heat conducting material and an internal enclosure made of heat insulating material, the internal enclosure having a through opening in which a heat conducting structure of heat conducting material is positioned, and
    wherein said active heat transfer device has a first portion in contact with the heat conducting structure and a second portion in contact with the external shell.

5. In a ruggedized hard disk system as in claim 1, wherein the arrangement supplementing passive heat transfer from the disk housing comprises a plurality of solid state heat pumps positioned between the disk housing and the exterior of the environmental housing, the solid state heat pumps together having a cooling capacity significantly greater than necessary to cool the disk housing, each of said solid state heat pumps operating significantly below its cooling capacity but at a capacity sufficient, with the other solid state heat pump, to cool the disk housing.

6. In a ruggedized hard disk system as in claim 1, wherein said environmental housing is an aluminum enclosure having fins for heat transfer enhancement.

7. In a ruggedized hard disk system as in claim 2, wherein the heat conducting structure is a metal plate.

8. In a ruggedized hard disk system as in claim 2, wherein the active heat transfer device and the heat conducting structure are fixed in the environmental housing, and the heat conducting structure is engaged by the disk drive housing in heat transferring contact.

9. In a ruggedized hard disk system as in claim 2, wherein said solid state heat pump is a Peltier effect device.

10. In a ruggedized hard disk system as in claim 3, wherein said active heat transfer device is a heat pipe.

11. In a ruggedized hard disk system as in claim 4, further comprising means for biasing said disk drive housing into heat transferring contact with said heat conducting structure.

12. In a ruggedized hard disk system as in claim 4, wherein said internal receptacle has a plurality of sides, said through opening is defined through one of said sides of said receptacle, and the other sides of the receptacle are made of the heat insulating material.

13. In a ruggedized hard disk system as in claim 6, wherein said active heat transfer device is a heat pipe, said heat pipe being flexible between said first and second portions.

14. In a ruggedized hard disk system as in claim 11, wherein said means for biasing comprises wedge members interacting with one another to move said disk drive housing into heat transferring contact with said heat conducting structure.

15. In a ruggedized hard disk system as in claim 11, wherein said means for biasing comprises a) pins extending laterally from one of said disk drive housing and the environmental housing and b) grooves defined in the other of said disk drive housing and the environmental housing, said pins being received in and cooperating with said grooves to move said hard disk housing toward heat transferring contact with said heat conducting structure as said disk drive housing is inserted into said environmental housing.

16. The hard disk system of claim 13, wherein the heat pipe comprises a shell containing a low vapor-point liquid.

17. The hard disk system of claim 13, wherein the heat pipe has a flexible bellows portion between the first portion and the opposite portion.

18. In a ruggedized hard disk system as in claim 14, wherein said means for biasing further comprises an actuating mechanism connected to the wedge members to move at least one wedge member relative to at least one other wedge member to move said disk drive housing from a first position, in which said disk drive housing is not in firm heat transfer contact with said heat conducting structure, to a second position, in which said disk drive housing is in firm heat transfer contact with said heat conducting structure.

19. In a ruggedized hard disk system as in claim 15, further comprising an opening in said environmental housing for receiving the hard disk housing, a door mounted to selectively cover said opening in said environmental housing, and a wedge structure connected with said door for moving said hard disk housing into heat transferring contact with said heat conducting structure as said door is closed.

20. In a ruggedized hard disk system as in claim 18, wherein said environmental housing has a receiving opening sized to permit said disk drive housing to pass through, and a door for covering said receiving opening, and
    wherein, in the first position of the disk drive housing, said actuating mechanism blocks said door from covering the receiving opening, and, in the second position of the disk drive housing, said actuating mechanism permits said door to cover the receiving opening.

21. In a ruggedized hard disk system as in claim 18, wherein said environmental housing has a receiving opening sized to permit said disk drive housing to pass through, and said actuating mechanism is movable to engage the environmental housing and thereby eject at least a portion of the disk drive housing from the environmental housing.

22. In a ruggedized hard disk system as in claim 18, wherein a pin connector holds the disk drive housing in the environmental housing, and said actuating mechanism comprises means for ejecting the disk drive housing from the hold of the pin connector.

23. In a ruggedized hard disk system as in claim 19, wherein said wedge structure engages said pins.

24. A method for supplementing passive heat transfer in a ruggedized hard disk system from a disk drive housing to an environmental housing containing the disk drive housing and having an interior and an exterior, comprising:

positioning a plurality of solid state heat pumps between the disk drive housing and the exterior of the environmental housing.

25. The method of claim 24, wherein the solid state heat pumps together having a heat transfer capacity that is greater than the supplemental heat transfer needs of the ruggedized hard disk system, and each of the solid state heat pumps is operated at significantly less than half of its individual heat transfer capacity, by which operation the solid state heat pumps still satisfy said supplemental heat transfer needs, whereby the solid state heat pumps operate at a greater efficiency than at their heat transfer capacity.

* * * * *